(12) United States Patent
Vilander et al.

(10) Patent No.: US 7,302,497 B2
(45) Date of Patent: Nov. 27, 2007

(54) USING INTERNET PROTOCOL (IP) IN RADIO ACCESS NETWORK

(75) Inventors: Harri Tapani Vilander, Espoo (FI); David Comstock, Sollentuna (SE); Krister Samuelson, Stockholm (SE); Bo Jerker Karlander, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 806 days.

(21) Appl. No.: 09/734,040

(22) Filed: Dec. 12, 2000

(65) Prior Publication Data
US 2004/0010609 A1 Jan. 15, 2004

Related U.S. Application Data

(60) Provisional application No. 60/181,083, filed on Feb. 8, 2000.

(51) Int. Cl.
*G06F 15/16* (2006.01)
*H04L 12/56* (2006.01)

(52) U.S. Cl. .................. 709/249; 709/250; 370/395.52

(58) Field of Classification Search ........ 709/217–219, 709/229–231, 236, 249, 238, 245, 24; 370/252, 370/395.5, 395.52, 401, 352
See application file for complete search history.

(56) References Cited

U.S. PATENT DOCUMENTS

| | | | | |
|---|---|---|---|---|
| 5,802,064 | A * | 9/1998 | Lieberman | 370/469 |
| 6,226,686 | B1 * | 5/2001 | Rothschild et al. | 709/245 |
| 6,366,961 | B1 * | 4/2002 | Subbiah et al. | 709/238 |
| 6,374,112 | B1 * | 4/2002 | Widegren et al. | 455/452.2 |
| 6,385,195 | B2 * | 5/2002 | Sicher et al. | 370/356 |
| 6,487,595 | B1 * | 11/2002 | Turunen et al. | 709/226 |
| 6,587,457 | B1 * | 7/2003 | Mikkonen | 370/356 |
| 6,633,564 | B1 * | 10/2003 | Steer et al. | 370/389 |
| 6,654,344 | B1 * | 11/2003 | Toporek et al. | 370/230 |

(Continued)

FOREIGN PATENT DOCUMENTS

| | | |
|---|---|---|
| WO | 99/56445 A2 | 11/1999 |
| WO | 00/52884 A2 | 9/2000 |

OTHER PUBLICATIONS

Michael Menth, Carrying Wirless Traffic over IP Using Realtime Transport Protocol Multiplexing,Jan. 2000, University of Wurzburg, Report No. 247, pp. 1-17.*

(Continued)

*Primary Examiner*—Abdullah Salad
*Assistant Examiner*—Yasin M Barqadle
(74) *Attorney, Agent, or Firm*—Nixon & Vanderhye, P.C.

(57) ABSTRACT

A telecommunications system has a protocol architecture over an interface between nodes of the telecommunications system, the protocol architecture including Internet Protocol as a protocol above a link layer protocol in a transport network layer. The protocol architecture can be used over one or more of several interfaces, including the interface between a radio access network and a core network [Iu Interface]; the interface between radio network controllers (RNCs) and the base stations (BSs) served thereby [Iub Interface]; and the interface between a Source RNC (SRNC) and a Drift RNC (DRNC) [Iur Interface]. A new XTP Protocol is proposed as another aspect of the invention, which is usable in a protocol stack for the Iu-PS (packet switched) implementation as well as over the Iu-CS, Iub, and Iur Interfaces.

10 Claims, 10 Drawing Sheets

U.S. PATENT DOCUMENTS 6,714,987 B1 * 3/2004 Amin et al. ................. 709/249
2003/0039237 A1 * 2/2003 Forslow ...................... 370/352

OTHER PUBLICATIONS

Espen Klovning and Oliver Bonaventure, Coordination , Implemetntion and Operation of Multimedia Services, Oct. 1996, Universite de Liege, RACE 2060, pp. 1-4, 6-7, and 9-16.*

Menth, "Carrying Wireless Traffic Over IP Using Realtime Transport Protocol Multiplexing", University of Würzburg, Institute of Computer Science Research Report Series, No. 247, Jan. 2000, pp. 1-16.

Subbiah et al, "RTP Payload Multiplexing Between IP Telephony Gateways", IEEE, Global Telecommunications Conference, Globecomm 99, EIII 1999, pp. 1121-1127.

* cited by examiner

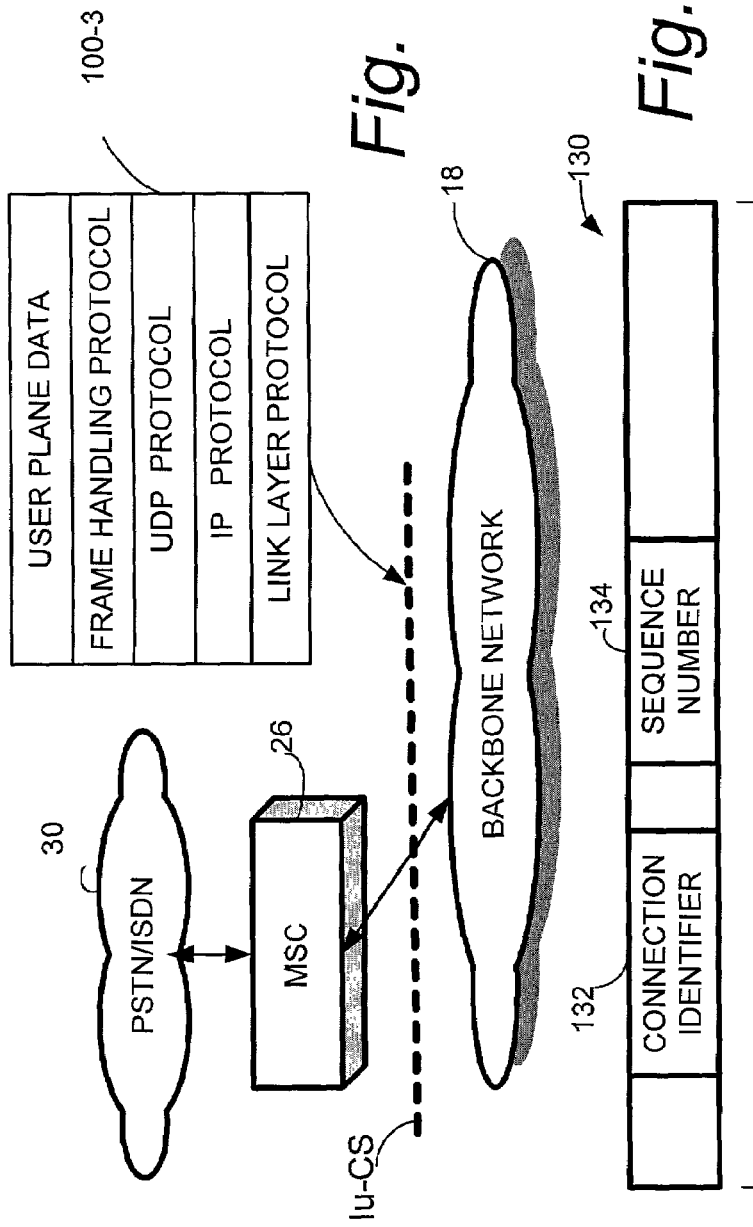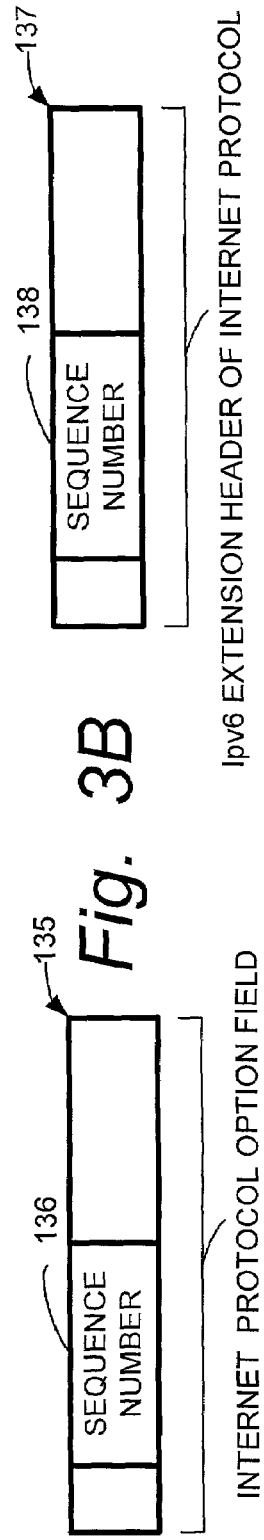

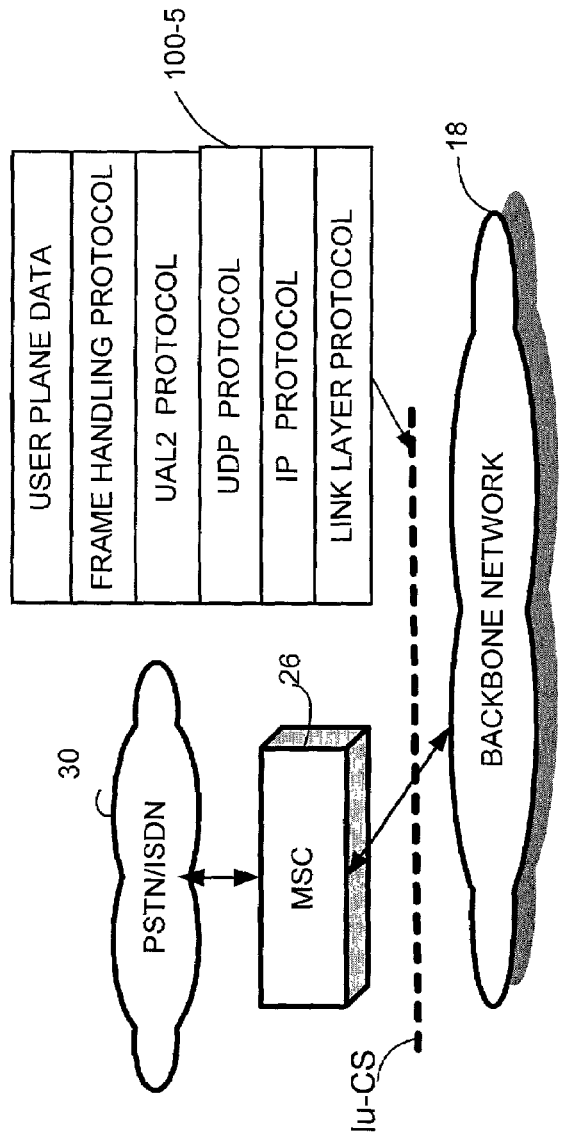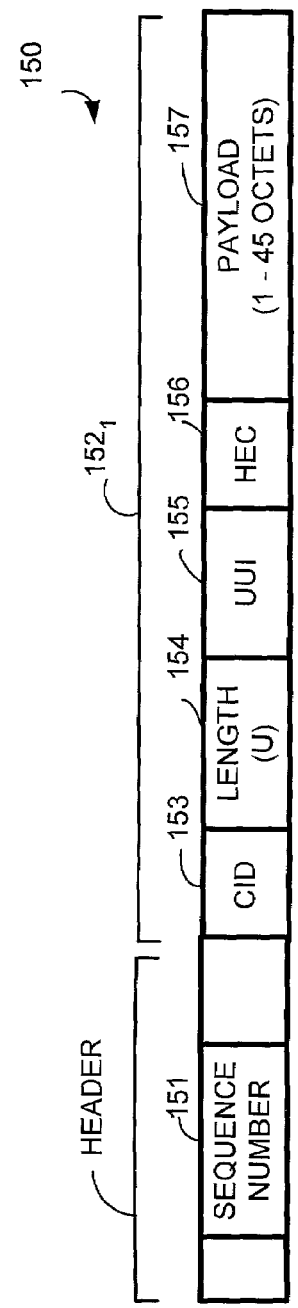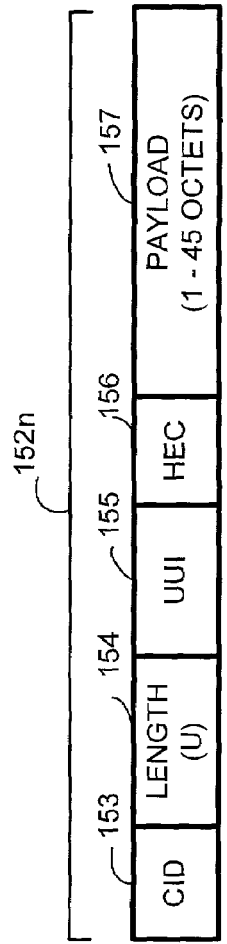
Fig. 5
Fig. 5A

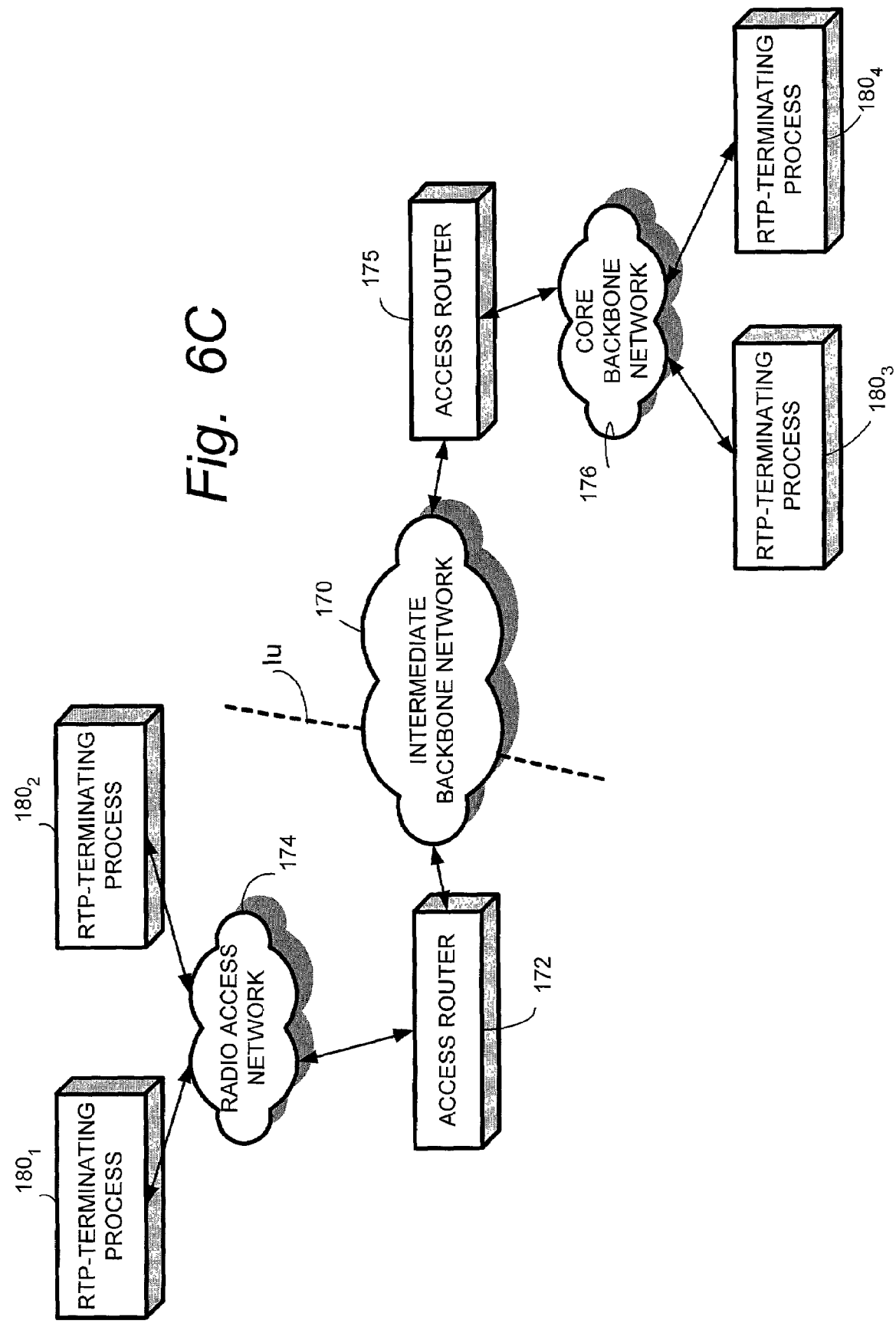

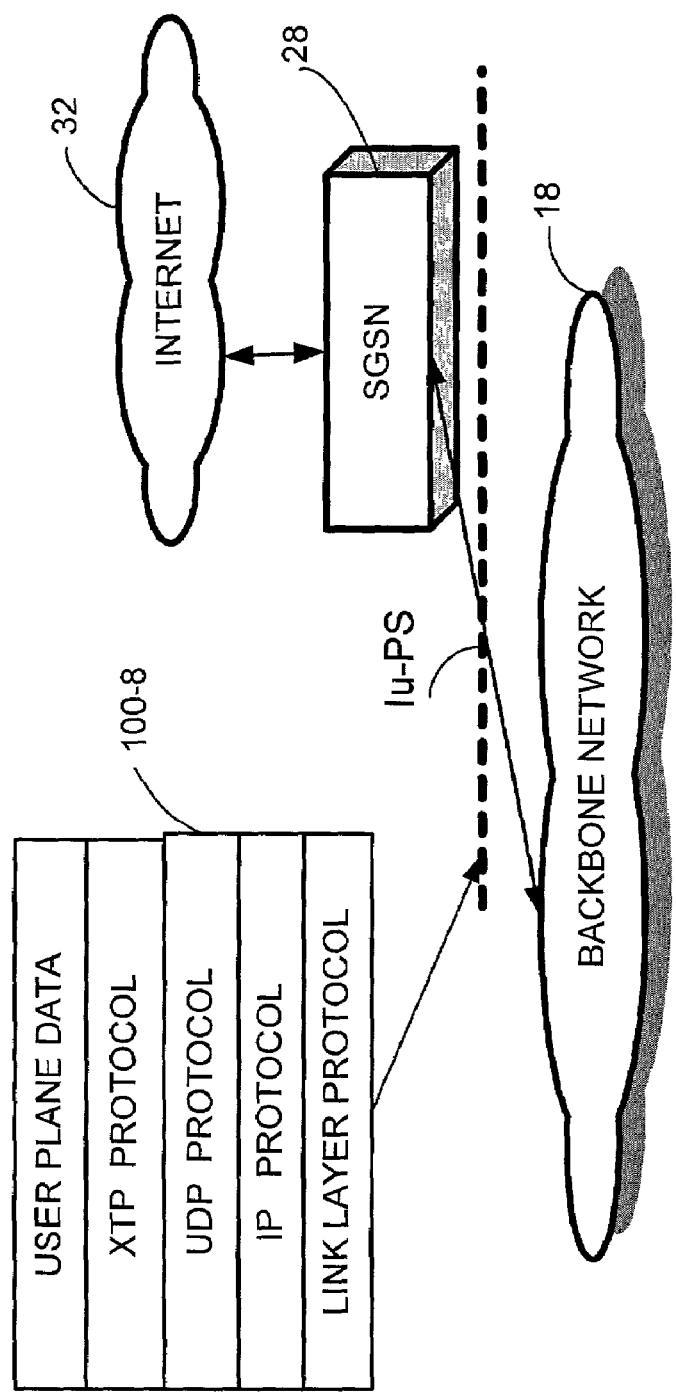

USING INTERNET PROTOCOL (IP) IN RADIO ACCESS NETWORK

This application claims the benefit and priority of U.S. Provisional patent application Ser. No. 60/181,083, filed Feb. 8, 2000, which is incorporated herein by reference in its entirety.

BACKGROUND

1. Field of the Invention

The present invention pertains to telecommunications, and particularly to using Internet Protocol (IP) with and/or in a radio access network (RAN).

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to the one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks)

There are several interfaces of interest in the UTRAN. The interface between the radio network controllers (RNCs) and the core network(s) is termed the "Iu" interface. The circuit switched aspects of the Iu Interface are termed the "Iu-CS" Interface; the packet switched aspects of the Iu Interface are termed the "Iu-PS" Interface. The interface between a radio network controller (RNC) and its base stations (BSs) is termed the "Iub" interface. In some instances, a connection involves both a Source RNC (SRNC) and a Drift RNC (DRNC), with the SRNC controlling the connection but with one or more diversity legs of the connection being handling by the DRNC (see, in this regard, U.S. patent application Ser. No. 09/035,821 filed Mar. 6, 1998, entitled "Telecommunications Inter-Exchange Measurement Transfer"; and U.S. patent application Ser. No. 09/035,788 filed Mar. 6, 1998, entitled "Telecommunications Inter-Exchange Congestion Control"). The interface between a SRNC and a DRNC is termed the "Iur" interface.

A project known as the Third Generation Partnership Project (3GPP) has undertaken to evolve further the UTRAN and GSM-based radio access network technologies. A user plane protocol for 3GPP-99 is illustrated in FIG. 7. FIG. 7 particularly shows (as the left stack) the user plane protocol stack for the Iu-CS, Iur, and Iub Interfaces and (as the right stack) the user plane protocol stack for the Iu-PS Interface. As shown in FIG. 7, the user plane protocol stack is divided between a radio network layer and a transport network layer. Portions of the 3GPP-99 user plane protocol stack which are attributable to the transport network layer are shaded in FIG. 7. The transport network layer provides transport services needed by the radio network layer.

As apparent from FIG. 7, the lower protocols of stacks for the 3GPP-99 user plane protocol stacks employ Asynchronous Transfer Mode (ATM) technology. ATM is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

A protocol reference model has been developed for illustrating layering of ATM. The protocol reference model layers include (from lower to higher layers) a physical layer (including both a physical medium sublayer and a transmission convergence sublayer), an ATM layer, and an ATM adaptation layer (AAL), and higher layers. The basic purpose of the AAL layer is to isolate the higher layers from specific characteristics of the ATM layer by mapping the higher-layer protocol data units (PDU) into the information field of the ATM cell and vise versa. There are several differing AAL types or categories, including AAL0, AAL1, AAL2, AAL3/4, and AAL5. Yet another AAL type, known as AAL2 prime, is described in the following (all of which are incorporated herein by reference: U.S. patent application Ser. No. 09/188,102, filed Nov. 9, 1998; U.S. patent application Ser. No. 09/188,347, filed Nov. 9, 1998; and International Patent Application Number PCT/SE98/02250 (WO 99/33315, published Jul. 1, 1999).

AAL2 is a standard defined by ITU recommendation 1.363.2. An AAL2 packet comprises a three octet packet header, as well as a packet payload. The AAL2 packet header includes an eight bit channel identifier (CID), a six bit length indicator (LI), a five bit User-to-User indicator (UUI), and five bits of header error control (HEC). The AAL2 packet payload, which carries user data, can vary from one to forty-five octets An object of the present invention, in one aspect, is utilization of Internet Protocol in lieu of the ATM protocol in the user plane protocol stacks for various interfaces (e.g., Iu-CS Interface, Iur Interface, and Iub Interface) of a radio access network such as UTRAN, and in another aspect is provision of a new transport network layer protocol usable on these interfaces as well as on the Iu-PS Interface.

BRIEF SUMMARY OF THE INVENTION

A telecommunications system has a protocol architecture over an interface between nodes of the telecommunications system, the protocol architecture including Internet Protocol as a protocol above a link layer protocol. The protocol architecture can be used over one or more of several interfaces, including the interface between a radio access network and a core network [Iu Interface]; the interface between radio network controllers (RNCs) and the base stations (BSs) served thereby [Iub Interface]; and the interface between RNCs (e.g., between a Source RNC (SRNC) and a Drift RNC (DRNC)) [Iur Interface].

Several implementations of the protocol architecture for the Iu-CS Interface, the Iur Interface, and the Iub Interface are disclosed. In a first implementation, the user plane protocol stack of the protocol architecture in the transport layer comprises the link layer protocol; the Internet Protocol on top of the link layer protocol; UDP Protocol on top of the Internet Protocol; and higher layers. In one technique associated with this first implementation, in the Internet Protocol a sequence number is carried in one of an IP option field and a Ipv6 extension header, the sequence number being used for rearranging incoming IP datagrams. In this technique, UDP port numbers are used as connection identifiers. In another technique for the first implementation, UDP/IP is employed, but the frame handling protocol of the upper layers rearranges in-coming frames over the interface, e.g., the frame handling protocol is modified to include a sequence number field and identifier used for rearranging incoming frames.

In a second implementation, the user plane protocol stack of the protocol architecture in the transport layer comprises the link layer protocol; the Internet Protocol on top of the link layer protocol; UDP Protocol on top of the Internet Protocol; and a wholly new protocol, herein denominated as the "XTP Protocol", on top of the UDP Protocol. Higher layers are on top of the XTP Protocol. In the XTP Protocol, each XTP packet has a connection identifier and a sequence number and a payload. The payload comprises upper layer protocols, e.g., frame handling and user plane data. In one mode of the implementation plural user plane data frames (e.g., speech frames) are multiplexed in one IP datagram.

In a third implementation, the user plane protocol stack of the protocol architecture in the transport layer comprises the link layer protocol; the Internet Protocol on top of the link layer protocol; UDP Protocol on top of the Internet Protocol; UAL2 Protocol on top of the UDP Protocol; and higher layers. The UAL2 protocol essentially resembles the AAL2 Protocol, but each UAL2-PDU carries an integer number of AAL2 packets (no fractional AAL2 packets). Also, UAL2 contains sequence numbers for facilitating in-sequence delivery.

In a fourth implementation, the user plane protocol stack of the protocol architecture in the transport layer comprises the link layer protocol; the Internet Protocol on top of the link layer protocol; UDP Protocol on top of the Internet Protocol; RTP Protocol on top of the UDP Protocol; and higher layers. In accordance with one variation of the fourth implementation, in the RTP Protocol one synchronization source (SSRC) identifier is allocated to each circuit switched connection between two nodes over the involved interface (e.g., between the node in the radio access network and the node in the core network for the Iu Interface). In accordance with one variation of the fourth implementation, the RTP Protocol compresses plural RTP packets in an IP datagram.

The new XTP Protocol which is an aspect of the invention can also be used in a protocol stack for a Iu-PS (packet switched) Interface implementation. In this Iu-PS (packet switched) Interface implementation, the user plane protocol stack of the protocol architecture in the transport layer comprises the link layer protocol; the Internet Protocol on top of the link layer protocol; UDP Protocol on top of the Internet Protocol; XTP Protocol on top of the UDP Protocol; and higher layers.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a schematic view of a portion of the telecommunications system of FIG. 1 in accordance with a first example implementation of an IP-based protocol stack for the Iu-CS Interface.

FIG. 3A is a diagrammatic view illustrating a technique of introducing a sequence number in the Frame Handling Protocol to facilitate rearranging of incoming frames.

FIG. 3B is a diagrammatic view illustrating a technique of introducing a sequence number in an Internet Protocol (IP) option field.

FIG. 3C is a diagrammatic view illustrating a technique of introducing a sequence number in an Ipv6 header of the Internet Protocol (IP).

FIG. 5 is a schematic view of a portion of the telecommunications system of FIG. 1 in accordance with a third example implementation of an IP-based protocol stack for the Iu-CS Interface.

FIG. 5A is a diagrammatic view showing a multiple integer number of AAL2 packets in a UAL2-PDU in accordance with the example implementation of FIG. 5.

FIG. 6C is a schematic view showing a network configuration for a specific RTP multiplexing scenario in accordance with the example implementation of FIG. 6.

FIG. 8 is a schematic view of a portion of the telecommunications system of FIG. 1 in accordance with an example implementation of an IP-based protocol stack for the Iu-PS Interface.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
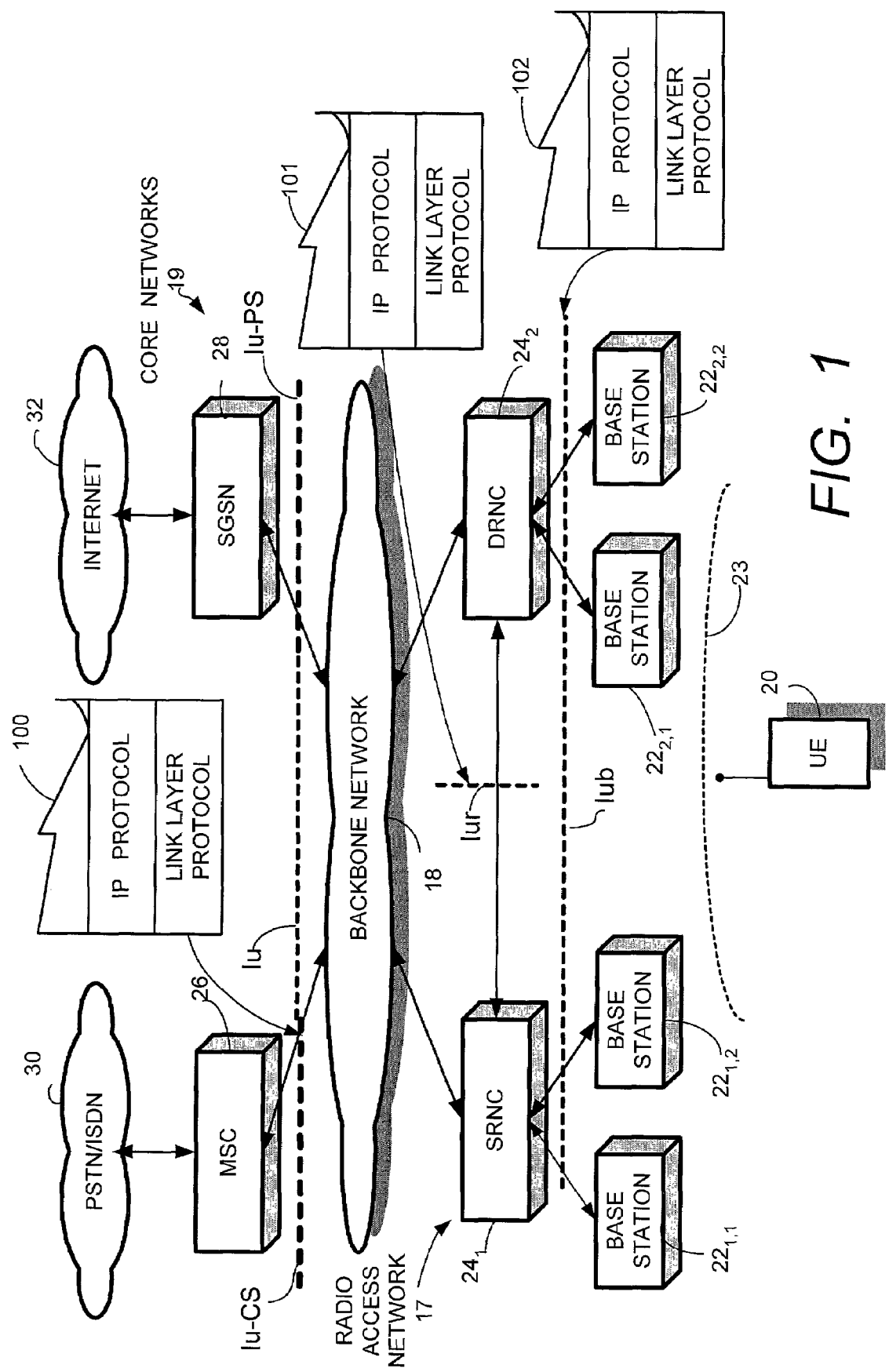
FIG. 1 is a schematic view of an embodiment of a telecommunications system which utilizes the present invention.

FIG. 1 shows a radio access network 17 which communicates over backbone network 18 to core networks 19. In radio access network 17, which happens to be a UTRAN-based radio access network, a user equipment unit (UE) 20 communicates with one or more base stations 22 over air interface (e.g., radio interface) 23. For sake of simplicity, four representative base stations $22_{1,1}$, $22_{1,2}$, $22_{2,1}$, and $22_{2,2}$ are illustrated in FIG. 1. A first set of base stations (e.g., base stations $22_{1,1}$, $22_{1,2}$) are connected (by terrestrial lines or microwave) to and controlled by a first radio network controller (RNC) $24_1$. A second set of base stations (e.g., base stations $22_{2,1}$, $22_{2,2}$) are connected to and controlled by a second radio network controller (RNC) $24_2$. (Those skilled in the art will appreciate that a RNC has also been referred to as a base station controller (BSC) in some networks). The radio network controllers (RNCs) $24_1$, $24_2$ are, in turn, connected to backbone network 18. The backbone network 18 comprises a number of Internet Protocol (IP) routers connected in a high capacity (e.g., high bandwidth) network. The core networks 19 are also connected to backbone network 18. The core networks comprise plural core network nodes, of which in representative fashion FIG. 1 illustrates two such core network nodes, particularly Mobile Switching Center (MSC) node 26 and Serving GPRS Support Node (SGSN) 28 being connected to backbone network 18. The Mobile Switching Center (MSC) node 26 is connected to circuit-switched telephone networks (PSTNI-ISDN) represented by cloud 30. Serving GPRS Support Node (SGSN) 283s connected to packet-switched networks (e.g., the Internet) as represented by cloud 32. One core network node (MSC or SGSN) may control several RNCs simultaneously.

As understood by those skilled in the art, when user equipment unit 20 participates in a mobile telephonic connection, signaling information and user information from user equipment unit 20 are transmitted over air interface 23 on designated radio channels to one or more of the base stations 22. The base stations have radio transceivers which transmit and receive radio signals involved in the connection or session. For information on the uplink from the user equipment unit 20 toward the other party involved in the connection, the base stations convert the radio-acquired information to digital signals which are forwarded to the appropriate radio network controller (RNC) 24.

A certain controlling radio network controller (RNC), known as the Source RNC (SRNC), orchestrates participation of the plural base stations 22 which may be involved in the connection or session, since user equipment unit 20 may be geographically moving and handover may be occurring relative to the base stations 22. Some of those base stations may be associated with a radio network controller (RNC) other than the Source RNC, the other such non-Source RNCs being denominated a Drift RNC or DRNC. In the particular example of FIG. 1, for an example connection the radio network controller (RNC) $24_1$ is serving as the Source RNC while the radio network controller (RNC) $24_2$ serves as the Drift RNC. On the uplink, the Source radio network controller (SRNC) $24_1$ picks frames of user information from one or more base stations 22 to yield a connection between user equipment unit 20 and the other party, whether that party be in PSTN/IDSN 28 or on the packet-switched networks (e.g., the Internet) 32. Herein, the terminology "RNC" is utilized in certain contexts to encompass both the Source RNC and the Drift RNC.

The telecommunications system of FIG. 1 has the three interfaces Iu, Iur, and Iub.

The Iu Interface is shown between the core networks 19 and the RNCs (e.g., SRNC $24_1$ and DRNC $24_2$). The Iur Interface exists between the source radio network controller (RNC) $24_1$ and the drift radio network controller (RNC) $24_2$. The Iub Interface exists between the RNCs and the base stations 22. As shown in FIG. 1, Interface Iu includes both a circuit switched aspect (Iu-CS) and a packet switched aspect (Iu-PS).

In accordance with one aspect of the present invention, one or more of the interfaces Iu-CS, Iur, and Iub has Internet Protocol (IP) as a protocol above a link layer protocol. More particularly, in some example implementations of the present invention the Internet Protocol (IP) is in a transport layer immediately above the link layer protocol. In this regard, in terms of 3GPP parlance, the Internet Protocol (IP) of the present invention belongs to the transport network layer, but could be considered to be in another layer in another model of protocol architecture (e.g., in the network layer in the IETF protocol architecture).

In FIG. 1, portions of user plane protocol stacks 100, 101, and 102 are illustrated for the corresponding interfaces Iu-CS, Iur, and Iub. Notably, in accordance with the present invention, as shown in FIG. 1 the user plane protocol stacks 100, 101, and 102 for the corresponding three interfaces Iu-CS, Iur, and Iub have Internet Protocol (IP) as a protocol above a link layer protocol. For sake of generality, only the link layer protocol (the lowest protocol in the stacks) and the Internet Protocol (IP) are specifically shown in the user plane protocol stacks 100, 101, and 102 of FIG. 1, although (as understood from subsequent discussion) other higher layer protocols are laid higher on the stack.

Example implementations of the protocol stacks of the present invention include higher protocols (which can be stacked on the Internet Protocol (IP) of the user plane protocol stacks 100, 101, and 102 of FIG. 1). The example implementations described herein are primarily with reference to the Iu-CS Interface. However, it will be appreciated that various ones of the examples described below for the Iu Interface are also applicable to other interfaces such as the Iur Interface and Iub Interface. Moreover, in so far as the usage of the IP Protocol in the Iur Interface and Iub Interface are concerned, it will be understood that the connections between the involved nodes (e.g., RNC nodes $24_1$ and $24_2$ for the Iur Interface; RNC nodes 24 and BS nodes 22 for the Iub Interface) can involve backbone networks comparable to backbone network 18, rather than the particular connections illustrated in FIG. 1.

Figure 2:
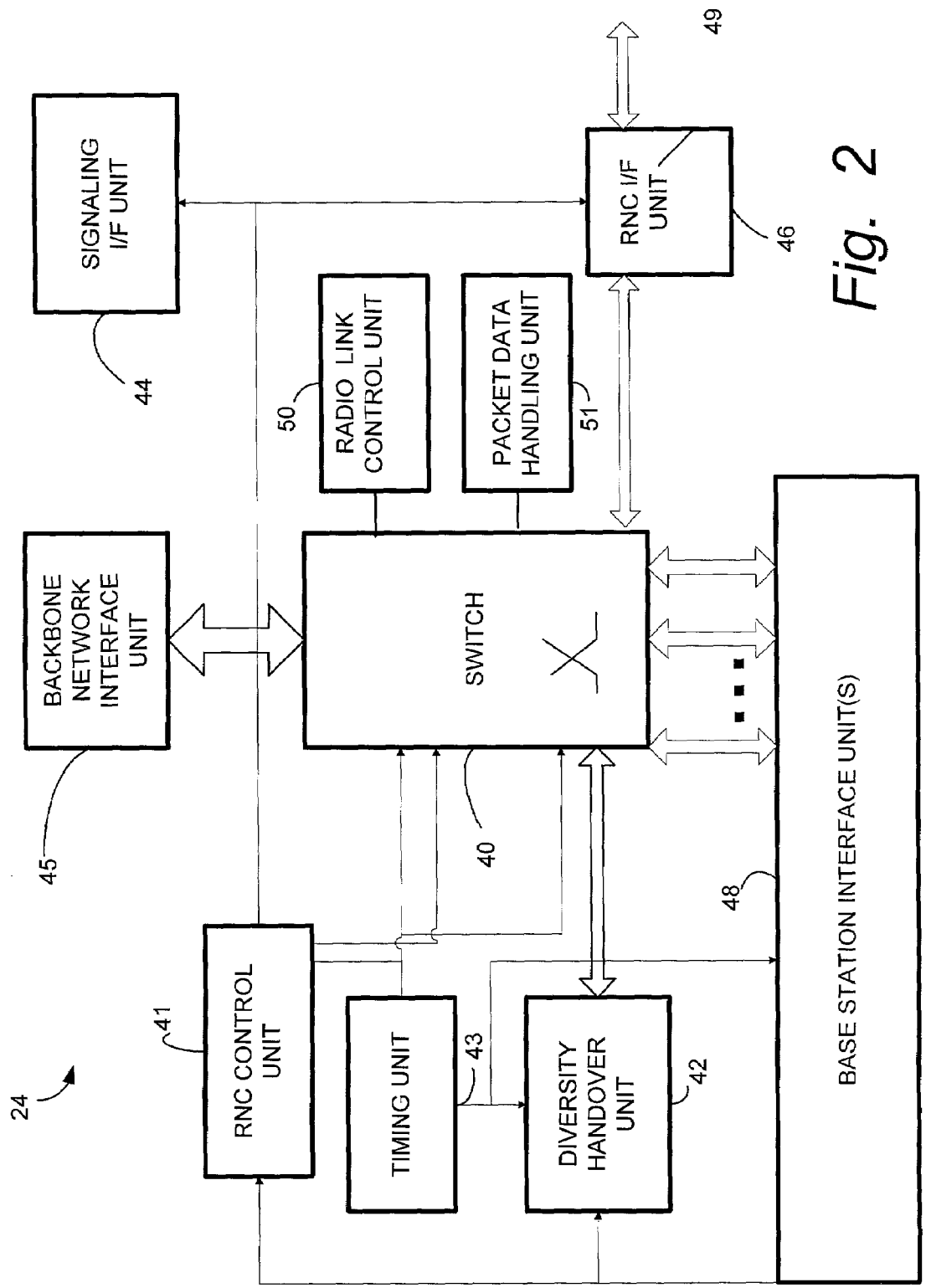
FIG. 2 is a schematic view of an example radio network controller (RNC) for the telecommunications system of the embodiment of FIG. 1.

In view of the description herein of example implementations of user plane protocol stacks relative to the Iu-CS Interface, brief discussion is first provided regarding certain aspects of the radio network controller (RNC) 24 generally. An example and representative radio network controller (RNC) 24 is shown in FIG. 2. In the radio network controller (RNC) 24 of FIG. 2, switch 40, which is controlled by RNC control unit 41, has a plurality of ports, some of which are connected to diversity handover unit (DHU) 42 and others of which are connected to various interfaces. Diversity handover unit (DHU) 42 is connected to a timing unit 43. The RNC control unit 41 is connected to each element of RNC 24. RNC 24 is connected to a signaling network via a signaling interface 44. Signaling interface 44 is connected to RNC control unit 41. The interfaces connected to ports of switch 40 include backbone network interface unit 45; RNC interface unit 46; and base station interface units 48. MSC interface unit 45 is connected to the backbone network 18. RNC interface unit 46 is connected to inter-RNC transport link 49. Base station interface units 48 are connected to the set of base stations (BS) served by the RNC 24.

The radio network controller (RNC) 24 additionally includes functionality for terminating/handling user plane data protocols. In this regard, FIG. 2 further shows radio network controller (RNC) 24 as including a radio link control (RLC) unit 50 and a packet data handling unit 51. The radio link control (RLC) unit 50 basically handles the radio link control toward the user equipment unit (UE) 20. Certain functions of the radio link control (RLC) unit 50 are retransmission of erroneous frames, error control, quality of service (QoS) coordination, etc. For packet switched connections, packet data handling unit 51 takes care of Iu-PS specific protocols (e.g., GTP [GPRS Tunnelling Protocol]) and communicates with packet switched core network nodes, such as SGSN 28 (see FIG. 1). If desired, the functionality of radio link control (RLC) unit 50 and packet data handling unit 51 can be combined in a single unit which handles user plane processing, e.g., a user plane processing (UPP) board.

It should be understood, however, that the RNC structure shown in FIG. 2 is just an example, and that other RNC structural configurations can be used consistently with the present invention. For example, rather than having a switch 40 (such as an ATM switch), the various boards or units of the RNC could each have a router, so that the IP router on each board would essentially map an IP address to an ATM VCI.

FIG. 3 through FIG. 6 describe differing implementation embodiments of user plane protocol stacks in accordance with the present invention. While illustrated chiefly in the context of the Iu-CS Interface, (as mentioned above) the user plane protocol stacks for the implementations of FIG. 3 through FIG. 6 are equally applicable to the Iur Interface and Iub Interface.

For the Iu-CS Interface, in the ensuing embodiments Ethernet is used as an non-limiting example of an appropriate link layer technology. The person skilled in the art will understand that Ethernet is just one example of suitable link layer technologies, other examples being Internet Protocol (IP) over Sonet, or Internet Protocol (IP) over SDH. Ethernet is appropriate for the link layer technology when the nodes are sufficiently close together. If the distance between nodes is great enough, a wide area network (WAN) link layer technology should be used. For the Iub Interface, existing point-to-point links may be re-used, so that the link layer may be, e.g., PPP, for example.

Figure 7:
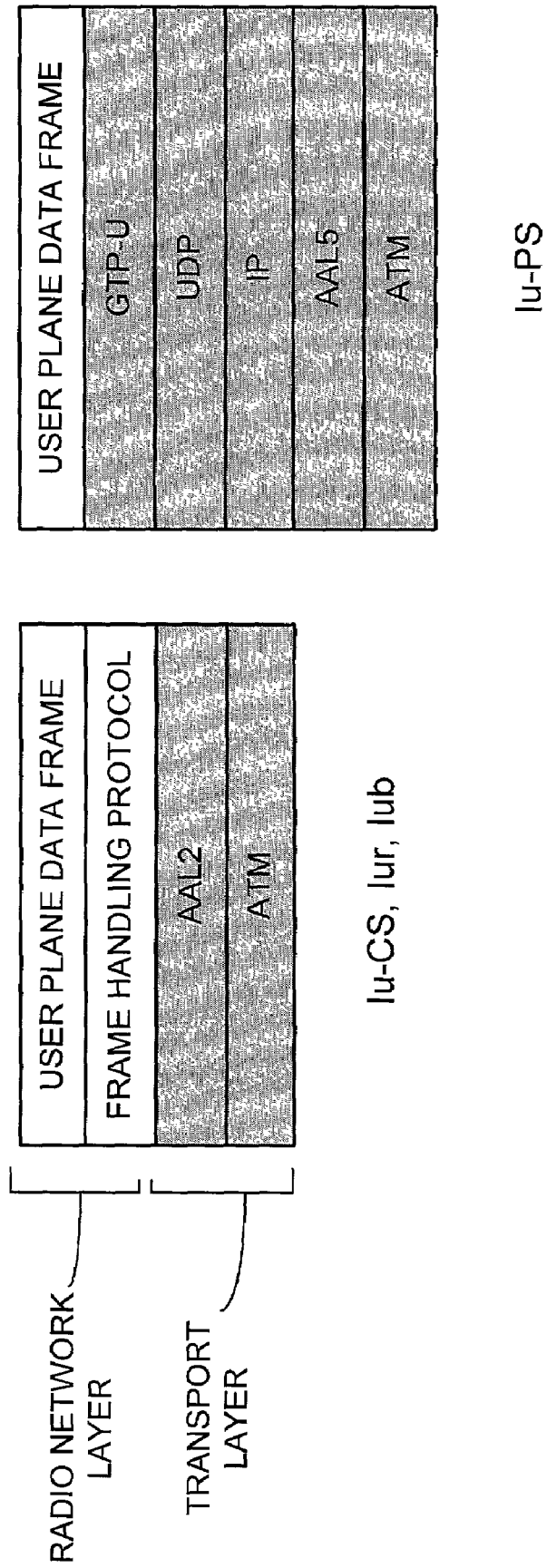
FIG. 7 is a diagrammatic view of a user plane protocol for 3GPP-99.

It will be appreciated that the present invention uses a link layer protocol (e.g., Ethernet) and the Internet Protocol (IP) to replace the ATM and AAL2 protocols, respectively, of FIG. 7. As indicated above, AAL2 protocol provides a connection identifier (the AAL2 CID) and ATM provides in-sequence delivery. Replacing AAL2 in the protocol stack for the interface (be it the Iu-CS Interface, the Iub Interface, or the Iur Interface) therefore involves identifying the user plane data flow between the same two nodes (e.g., between an RNC and MSC) within another protocol. Moreover, to compensate for the in-sequence delivery provided by ATM but not provided by IP protocol generally, the new protocol stacks of the invention provide means for a receiver to re-order the incoming IP datagrams, and to detect missing IP datagrams. For example, the new protocol stacks of the present invention incorporate a sequence number field of some type since IP datagrams of the IP Protocol may not always arrive in the order in which they have been sent.

FIG. 3 illustrates a portion of the telecommunications system of FIG. 1 in accordance with a first example implementation of an IP-based protocol stack for the involved interface (e.g., the Iu-CS Interface, the Iub Interface, or the Iur Interface). In particular, FIG. 3 illustrates the Iu-CS Interface connecting the radio access network 17 and circuit switched aspect of core networks 19 (e.g., Mobile Switching Center (MSC) node 26) as having a user plane protocol stack 100-3. In the user plane protocol stack 100-3, the ATM and AAL2 protocols of the conventional arrangement have been replaced with the appropriate link layer protocol (e.g., Ethernet); the IP Protocol; and the UDP Protocol. Thus, the user plane protocol stack 100-3 of the protocol architecture in the transport network layer for the FIG. 3 implementation comprises the link layer protocol, the Internet Protocol on top of the link layer protocol, and the UDP Protocol on top of the Internet Protocol. Further, the Frame Handling Protocol is on top of the UDP Protocol, and the user plane data frame is on top of the Frame Handling Protocol.

Those skilled in the art understand that UDP is a simple datagram protocol which is layered directly above the Internet Protocol (IP). UDP address formats are identical to those used by the Transmission Control Protocol (TCP). Like TCP, UDP uses a port number along with an IP address to identify the endpoint of communication. The UDP port number space is separate from the TCP port number space (that is, a UDP port may not be "connected" to a TCP port).

In the FIG. 3 example implementation, the IP address carried by the IP Protocol is employed to identify the receiving node and also a device board in the receiving node, if needed. For example, in the context of the illustrated example radio network controller (RNC) 24 of FIG. 2, such a device board can be a radio link control (RLC) unit 50 (see FIG. 2) or a user plane processing (UPP) board as discussed above. In the FIG. 3 example implementation, the UDP port number carried by the UDP Protocol points out the user plane data flow, e.g., serving to take the place of or corresponding to the AAL2 CID.

The user plane protocol stack 100-3 of the FIG. 3 implementation does not, by itself, provide in-sequence delivery since IP datagrams of the IP Protocol may arrive in random order. In accordance with the present invention, there are various techniques for compensating for this phenomena. In one such technique, UDP/IP are employed, but the Frame Handling Protocol is modified so that the Frame Handling Protocol is able to rearrange the incoming frames. In particular, a new sequence number and connection identifier is introduced in the Frame Handling Protocol so that the Frame Handling Protocol is able to rearrange the incoming frames. FIG. 3A shows a frame header 130 for the Frame Handling Protocol, and shows that in accordance with this technique that a connection identifier field 132 and sequence number field 134 have been added. As an alternative to having a connection identifier in the frame protocol, UDP ports could be used for this purpose.

Another technique for the FIG. 3 implementation is to carry a sequence number in an Internet Protocol (IP) option field or in an Ipv6 extension header of the Internet Protocol (IP). In this regard, FIG. 3B shows Internet Protocol (IP) option field 135 carrying a sequence number 136, while FIG. 3B shows an Ivp6 extension header 137 carrying a sequence number 138. In this technique, UDP port numbers are used as connection identifiers. This technique requires, of course, some modifications in the Internet Protocol (IP) layer. With both techniques, the number of Internet Protocol (IP) packets is quite high, since this implementation does not provide multiplexing of several user plane data frames into one Internet Protocol (IP) datagram.

The example implementation of FIG. 3 thus advantageously does not require any new protocols, and has minimum protocol overhead. The example implementation of FIG. 3 requires some changing of 3GPP frame handling, and (as mentioned above) does not provide multiplexing of several user plane data frames into one IP datagram (potentially resulting in a large number of IP Datagrams). Moreover, a large number of UDP ports may have to be allocated for several user plane data flows.

Figure 4:
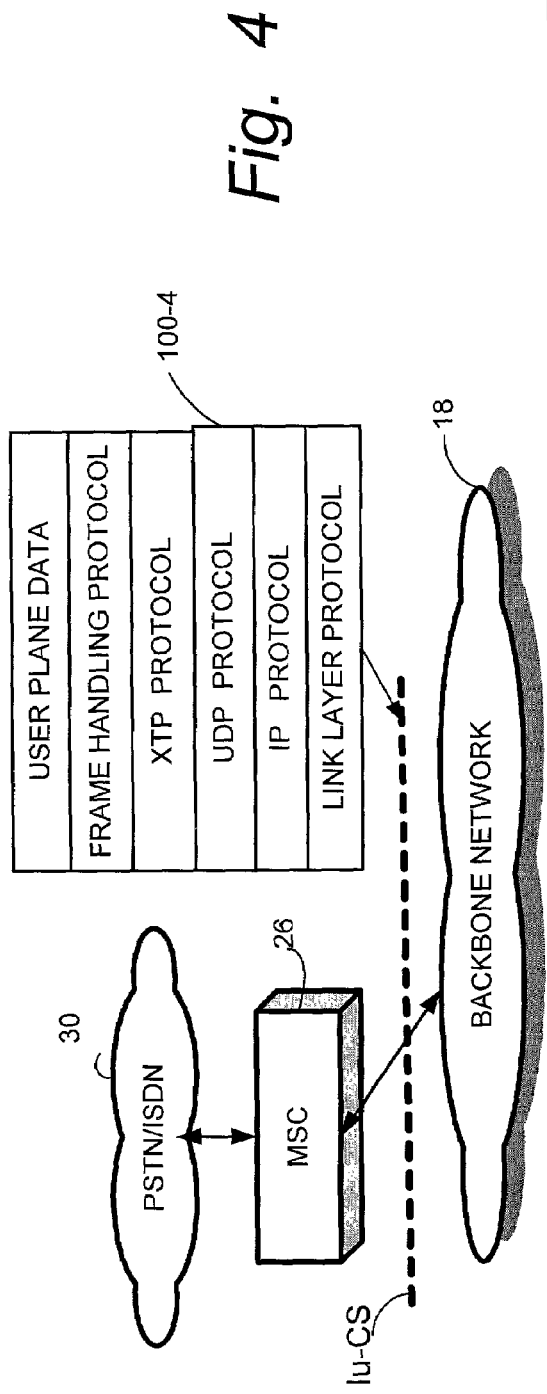
FIG. 4 is a schematic view of a portion of the telecommunications system of FIG. 1 in accordance with a second example implementation of an IP-based protocol stack for the Iu-CS Interface.

FIG. 4 illustrates a portion of the telecommunications system of FIG. 1 in accordance with a second example implementation of an IP-based protocol stack. In particular, FIG. 4 illustrates the Iu-CS Interface connecting the radio access network 17 and circuit switched aspect of core networks 19 (e.g., Mobile Switching Center (MSC) node 26) as having a user plane protocol stack 100-4. Again, while the illustration of FIG. 4 is provided in the context of the Iu-CS Interface, it should be understood that the principles of the FIG. 4 implementation also apply to the Iub Interface and the Iur Interface In the user plane protocol stack 100-4, the ATM and AAL2 protocols of the conventional arrangement have been replaced with four protocols: an appropriate link layer protocol (e.g., Ethernet), the IP Protocol, the UDP Protocol, and a wholly new protocol, herein termed the "XTP Protocol". Thus, the user plane protocol stack 100-4 of the protocol architecture in the transport network layer for the FIG. 3 implementation comprises the link layer protocol, the Internet Protocol on top of the link layer protocol, the UDP Protocol on top of the Internet Protocol, and the "XTP Protocol" on top of the UDP Protocol. Further, the Frame Handling Protocol is on top of the XTP Protocol, and the user plane data frame is on top of the Frame Handling Protocol.

The new XTP Protocol of the present invention is the inventors' own development. Therefore, the new XTP Protocol of the present invention is not to be confused with other protocols that may bear a similar acronym (such as the Express Transport Protocol, for example).

The new XTP Protocol is a user plane protocol that is located in the protocol stack between the UDP/IP and Frame Handling Protocols (see stack 100-4 in FIG. 4). The new XTP Protocol can be utilized on the Iu-CS Interface, the Iur Interface, and on the Iub Interface. The new XTP Protocol features functionalities such as connection identity; in-sequence delivery; and (optionally) multiplexing of several user plane frames into one IP Datagram.

Figure 4A:
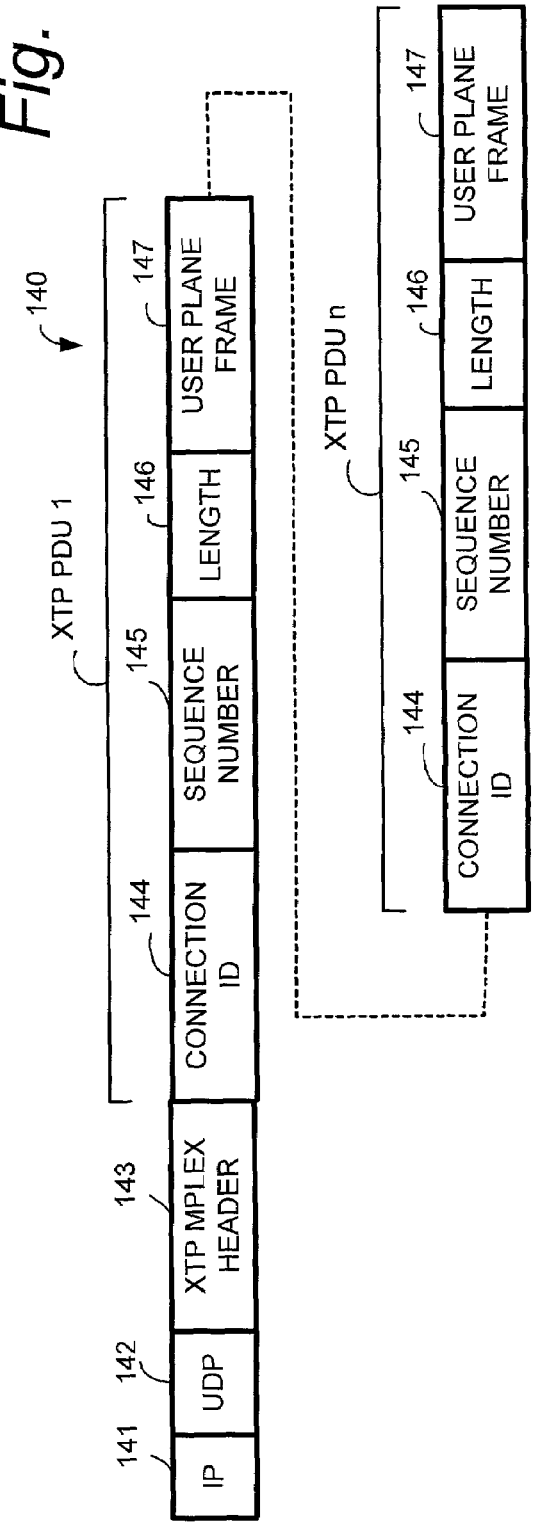
FIG. 4A is a diagrammatic view showing multiplexing of XTP packets into a single IP Packet in accordance with a mode of the example implementation of FIG. 4.

FIG. 4A shows an IP Datagram 140 which includes XTP PDUs in accordance with the new XTP Protocol. The IP Datagram 140 includes one or more XTP packets XPD PDU 1 through XPD PDU n. The IP Packet 140 also has an IP field 141; a UDP field 142; and a XTP multiplexing header 143. The XTP multiplexing header may include some values such as checksum and the total length in the beginning of the multiplexed packet. Each XTP PDU has a connection identifier field 144; a sequence number field 145; a length field 146; and a frame field or payload 147. The connection identifier field 144 replaces the AAL2 CID and serves to point out the user data flow.

The payload of the XTP packet 142 comprises upper layer protocols, e.g., frame handling and user plane data. In the FIG. 4 implementation, the connection identifier field 144 of the XTP packets 142 correspond to the AAL2 CID, e.g., the connection identifier field 144 identifies the user plane data flow between two nodes. The sequence number field 145 is used to rearrange packets at the receiving end. Length field 146 is utilized since the length of the user plane data frame field 147 may vary depending on user plane data activity.

The FIG. 4 implementation provides a connection identifier and in-sequence delivery. In addition, in one mode of the FIG. 4 implementation plural user plane data frames are optionally multiplexed into one IP Datagram. The FIG. 4 implementation thereby offers multiplexing of several user plane data frames (e.g., several XTP packets 142, each having a user plane data frame field 147) in one IP Packet 140 with minimum protocol overhead. It is also possible to calculate a checksum for every single XTP packet 142, but at the expense of increased protocol overhead. It is also possible to use Unequal Error Protection for XTP packets. This means that the checksum is calculated over headers (e.g., connection ID, sequence number, and length fields) but not over user plane data. This is feasible in some implementations since the application may not be able to utilize also erroneous user data. However, it is not feasible to use the data if the headers are not satisfactory.

The new XTP Protocol of the present invention has various implementation alternatives. A first implementation alternative is to use the connection identifier field 144 for its stated purpose of identifying a connection. But as a second implementation alternative, UDP ports can be used as connection identifiers. In this second implementation alternative, every user plane flow uses its own (dedicated) UDP port number. As a third implementation alternative, the Frame Handling Protocol can be modified much in the manner as above described with reference to FIG. 3A.

In-sequence delivery using the new XTP Protocol can also be facilitated with various implementation alternatives. A first such implementation alternative respecting in-sequence delivery is to use the sequence number field 145 (see FIG. 4A) for its stated purpose. A second implementation alternative respecting in-sequence delivery involves modifying the Frame Handling Protocol much in the manner as above described with reference to FIG. 3A.

In terms of its optional multiplexing, the new XTP Protocol features two methods. The two methods can be utilized simultaneously, if desired. A first method involves multiplexing on the XTP Protocol level above the Internet Protocol (IP), as illustrated with reference to FIG. 4A. This first method can only be employed if the connection identifier field 144 is utilized. A second method involves PPP multiplexing with header compression. This second method is the only viable method if UDP ports are used as connection identifiers (as discussed above).

With the new XTP Protocol of the present invention, the radio network layer is not affected. Moreover, the XTP Protocol provides the flexibility of using either its connection identifiers (i.e., connection identifier field 144) or UDP port fields to carry connection identification information. Further, the new XTP Protocol includes sequence numbers, facilitating in-sequence delivery.

The FIG. 4 implementation has advantages including the following: (1) minimum protocol overhead; (2) reduction in the number of IP Datagrams in view of potential multiplexing of user plane data frames in one IP Datagram (see FIG. 4A); (3) simplification relative to IETF's RTP and RTP multiplexing; (4) simpification relative to 3GPP's IU-PS GTP Protocol; and (5) RTP is not needed.

It should be understood that the FIG. 4 implementation does not mandate the multiplexing of user plane data frames in one IP Datagram. Over slow speed point-to-point links (e.g., T1) an operator may use link layer multiplexing (e.g., PPP multiplexing) instead of XTP multiplexing. With XTP multiplexing the size of IP packets increases, which in turn causes problems on slow links. The PPP multiplexing can be used together with header compression in order to decrease the amount of data to be sent over a slow speed link.

FIG. 5 illustrates a portion of the telecommunications system of FIG. 1 in accordance with a third example implementation of an IP-based protocol stack. The third example implementation can be utilized for the Iu-CS Interface, for the Iur Interface, and for the Iub Interface. FIG. 5 particularly illustrates the third example implementation for the Iu-CS Interface connecting the radio access network 17 and circuit switched aspect of core networks 19 (e.g., Mobile Switching Center (MSC) node 26) as having a user plane protocol stack 100-5. In the user plane protocol stack 100-5, the ATM and AAL2 protocols of the conventional arrangement have been replaced with four protocols: an appropriate link layer protocol (e.g., Ethernet), the IP Protocol, the UDP Protocol, and the UAL2 Protocol. Thus, the user plane protocol stack 100-5 of the protocol architecture in the transport network layer for the FIG. 3 implementation comprises the link layer protocol, the Internet Protocol on top of the link layer protocol, the UDP Protocol on top of the Internet Protocol, and the UAL2 Protocol on top of the UDP Protocol. Further, as in the other implementations, the Frame Handling Protocol is on top of the UAL2 Protocol, and the user plane data frame is on top of the Frame Handling Protocol.

The UAL2 Protocol, known as the "UDP Adaptation Layer for AAL2 Compatibility", is intended to provide the same service as the AAL2 CPS and uses the same packet format as AAL2 CPS. However, as shown in FIG. 5A, the format of a UAL2 PDU 150 is somewhat different from the format of the AAL2 CPS-DPU. In particular, as shown in FIG. 5A, in the UAL2 protocol an UAL2-PDU 150 carries an integer number k (e.g., integers one or greater, k capable of varying per UAL2-PDU) of AAL2 packets. It may be advantageous to allow an UAL2-PDU datagram to carry more than one AAL2 packet (e.g., k>1), in order to reduce transmission overhead for short packets. In addition, the header of the UAL2 PDU contains a sequence number field 151 to facilitate in-sequence delivery. Since there are no sequence numbers in AAL2, when using IP below UAL2 the sequence numbers are needed to provide in-sequence delivery.

As shown in FIG. 5A, each AAL2 packet 152 has a packet header comprising connection identifier (CID) 153; a length (U) field 154; a UUI field 155; and, an HEC field 156. In addition, each AAL2 packet 152 has a payload 157. The connection identifier (CID) 153 is eight bits in length, and identifies the individual user plane data flow connections. The length (U) field 154 is an indicator having information for unpacking a multi-packet UAL2-PDU. The UUI field 155 is five bits which carry information for segmentation and reassembly of user packets (AAL2 SDU) larger than the maximum AAL2 packet payload of 45 octets. The payload 157 ha a length ranging from one to forty-five octets.

Figure 6:
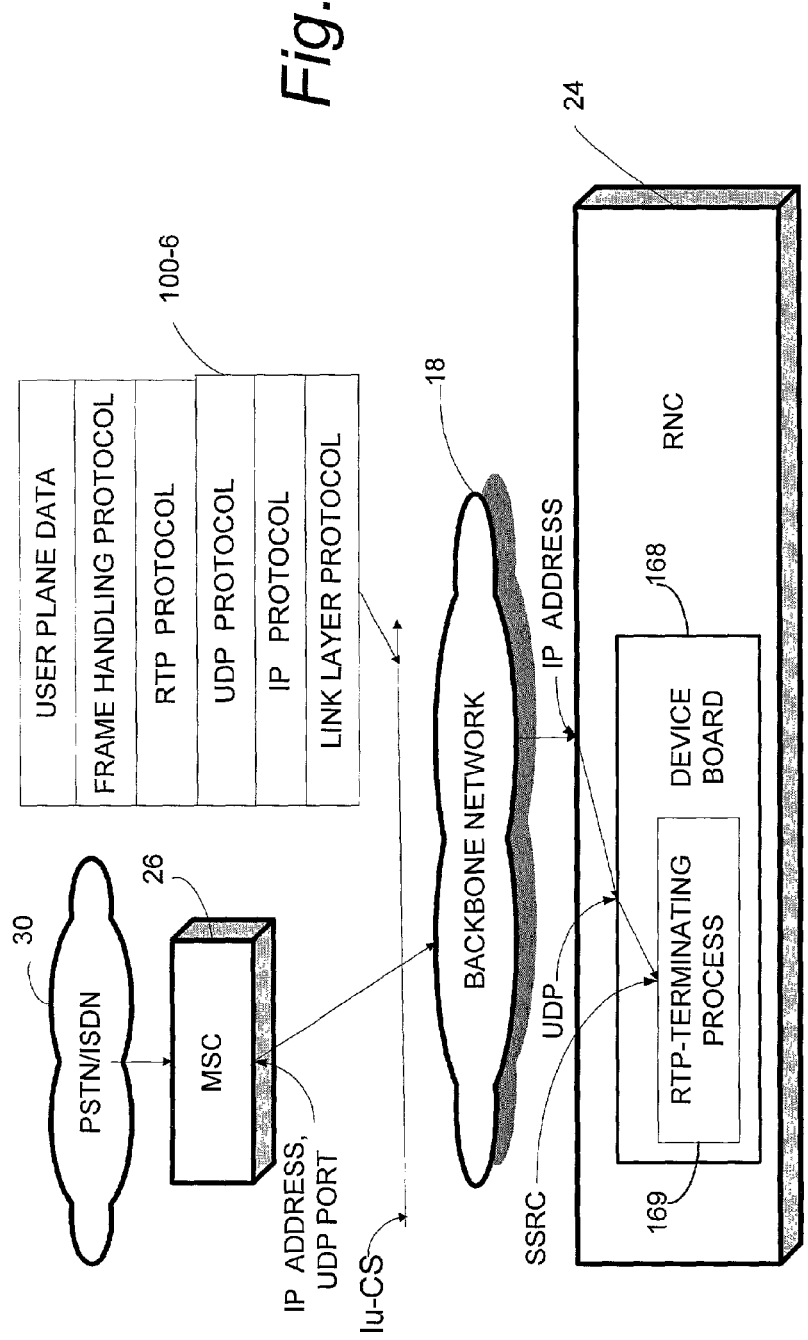
FIG. 6 is a schematic view of a portion of the telecommunications system of FIG. 1 in accordance with a fourth example implementation of an IP-based protocol stack for the Iu-CS Interface.

FIG. 6 illustrates a portion of the telecommunications system of FIG. 1 in accordance with a fourth example implementation of an IP-based protocol stack. The FIG. 6 implementation is particularly illustrated in the example context of the Iu-CS Interface (e.g., connecting the radio access network 17 and circuit switched aspect of core networks 19 (e.g., Mobile Switching Center (MSC) node 26)). However, the fourth example illustration of FIG. 6 is equally applicable to the Iur Interface and Iub Interface. The FIG. 6 implementation has a user plane protocol stack 100-6. In the user plane protocol stack 100-6, the ATM and AAL2 protocols of the conventional arrangement have been replaced with four protocols: an appropriate link layer protocol (e.g., Ethernet), the IP Protocol, the UDP Protocol, and the RTP Protocol. Thus, the user plane protocol stack 100-6 of the protocol architecture in the transport network layer for the FIG. 3 implementation comprises the link layer protocol, the Internet Protocol on top of the link layer protocol, the UDP Protocol on top of the Internet Protocol, and the RTP Protocol on top of the UDP Protocol. Further, the Frame Handling Protocol is on top of the RTP Protocol, and the user plane data frame is on top of the Frame Handling Protocol.

The RTP (Real-Time Transport) Protocol provides end-to-end networking transport functions suitable for applications transmitting real-time data. The RTP data transport is augmented by a control protocol (RTCP) to allow monitoring of the data delivery and to provide minimal control and identification functionality. The RTP and RTCP are designed to be independent of the underlying transport and network layers.

Figure 6A:
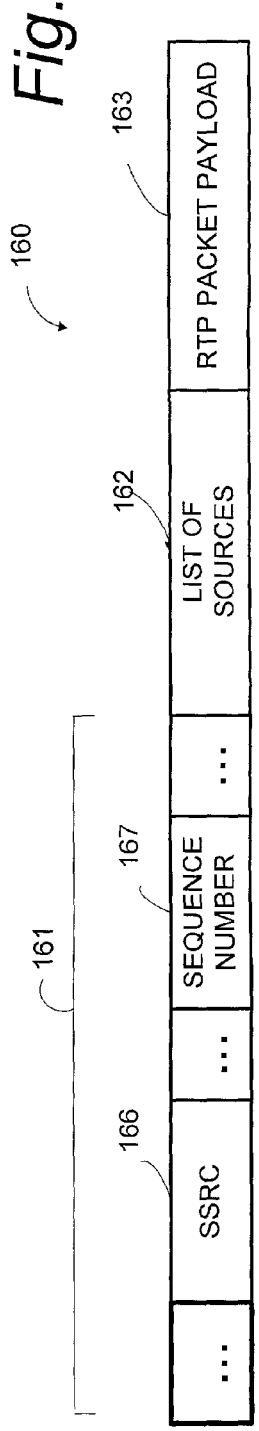
FIG. 6A is a diagrammatic view showing a RTP packet 160 in accordance with the example implementation of FIG. 6.

The general format of an RTP packet 160 is illustrated in FIG. 6A as comprising a fixed RTP header 161, a list of contributing sources 162, and RTP packet payload data 163. The RTP header 161 includes, among other things, a synchronization source (SSRC) identifier 166 and a sequence number 167.

Some underlying protocols may require an encapsulation of the RTP packet to be defined. Typically, one packet of the underlying protocol contains a single RTP packet, but several RTP packets may be contained if permitted by the encapsulation method. An RTCP packet comprises a fixed header part similar to that of the RTP data packets, followed by structured elements that vary depending upon the RTCP packet type. The RTP depends on the lower-layer protocols to provide some mechanism such as ports to multiplex the RTP and RTCP packets of a session. It is the combination of a network address and port that identifies a transport-level endpoint, for example an IP address and a UDP port. RTP packets are transmitted from a source transport address to a destination transport address. For each participant, an RTP session is defined by a particular pair of destination transport addresses (one network address pair for RTP and RTCP).

The synchronization source (SSRC) identifier 166 is a thirty-two bit field, which is required by RTP to be selected randomly with the intent that no two sources within the same RTP session (defined by the combination of IP address and UDP port) have the same SSRC identifier. In RTP, all packets from a synchronization source form part of the same timing and sequence number space, so a receiver groups packets by synchronization source for playback.

In the FIG. 6 implementation, an IP address can be assigned for a node or for a device board. Also, the UDP can be used to select a destination board within a node, with the SSRC identifier being used to indicate the user plane data flow to which a RTP packet 160 belongs. For example, FIG. 6 particularly shows a situation in which the IP address is used for specifying a node (e.g., radio network controller (RNC) 24); the UDP Port number is used for specifying a destination board (e.g., device board 168, which can be a user plane processing (UPP) board as described earlier); and the synchronization source (SSRC) identifier 166 is used to specify or point out the particular process which terminates the RTP protocol (e.g., process 169 in FIG. 6).

The RTP implementation of FIG. 6 also permits multiplexing in accordance with the present invention. Basically, in accordance with the present invention, a technique is employed to compress the following into an Internet Protocol (IP) Datagram: (1) the headers of appropriate RTP, UDP, and IP packets; and (2) several user plane data frames (E.g., several RTP packets 160). The Internet Protocol (IP) Datagram resulting from the compression is then sent to the receiving node. The receiving node decompresses the Internet Protocol (IP) Datagram and obtains the user plane data frames.

Thus, the FIG. 6 implementation, which includes RTP in the protocol stack, can also involve multiplexing. With respect to the Iu-CS Interface, the RTP Protocol is terminated at one end at the radio network controller (RNC) 24, e.g., on a user plane processing (UPP) board, and at the other end at the MSC. When multiplexing is used in this implementation, the multiplexing may be performed on some other board or even outside the terminating node (e.g., at a separate node such as an access router, etc.).

Figure 6B:
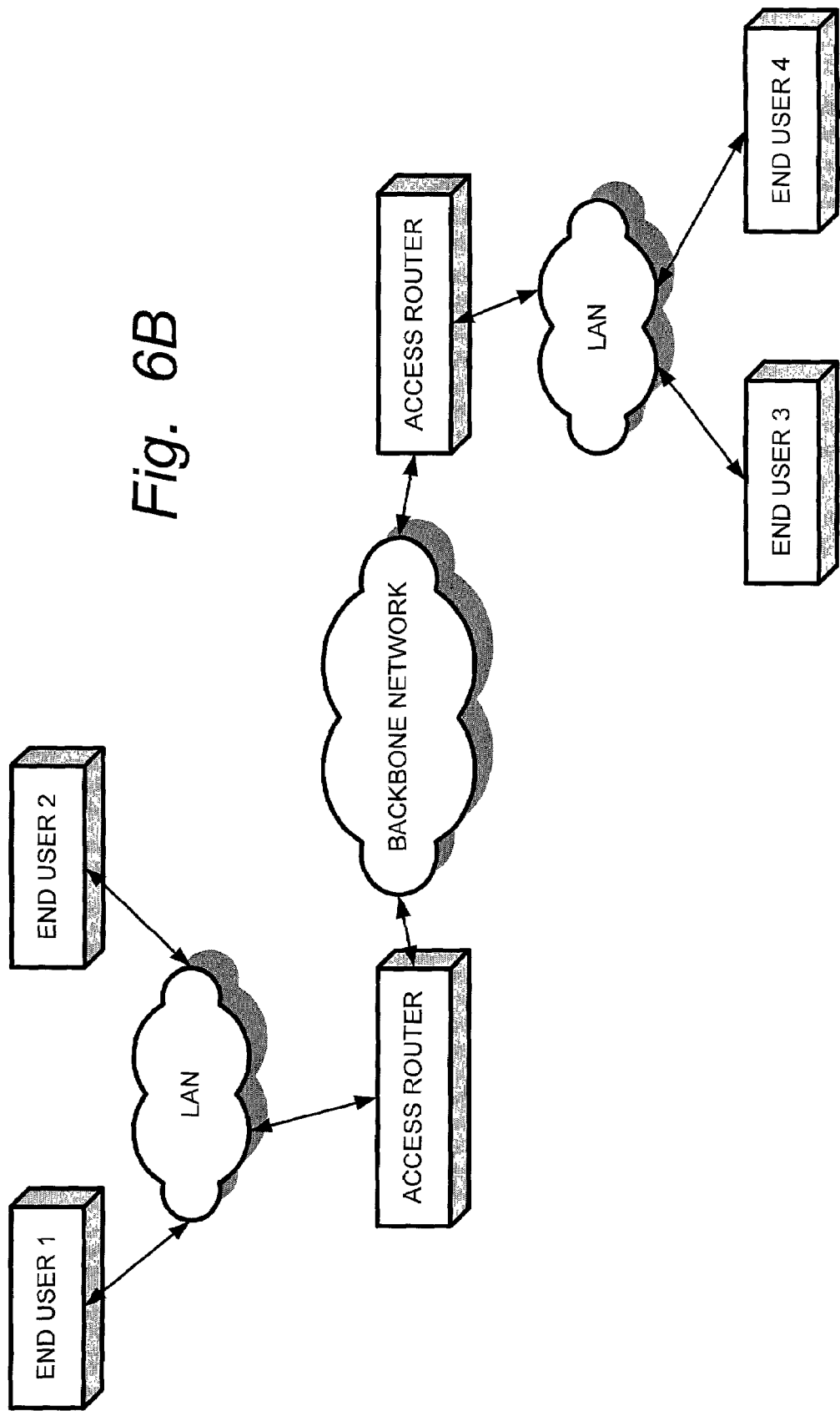
FIG. 6B is a schematic view showing a network configuration for a generic RTP multiplexing scenario in accordance with the example implementation of FIG. 6.

As illustrated generally in FIG. 6B, the RTP multiplexing technique of the present invention identifies connection flows (e.g., user plane data flows) in the access routers in a backbone network, and compresses Internet Protocol (IP) Datagrams in access routers. A receiving access router then decompresses the Internet Protocol (IP) Datagrams and forwards the decompressed Internet Protocol (IP) Datagrams to a receiving user. In the FIG. 6B context, a flow (e.g., CS connection) can be defined with a source Internet Protocol (IP) address, source port, destination Internet Protocol (IP) address, and destination port (and possibly also protocol).

FIG. 6C resembles the general illustration of FIG. 6B, but shows how the RTP multiplexing technique can be implemented across the Iu Interface. In FIG. 6C, an the Iu Interface extends through intermediate backbone network 170. The intermediate backbone network 170 is connected by router 172 to the radio access network 174 and by router 175 to core backbone network 176. The "end users" are RTP-terminating processes. RTP-terminating processes $180_1$ and $180_2$ are shown as being located on a user plane processing board (at a RNC); RTP-terminating processes 1803 and 1804 are located in the core network. The access routers 172 and 175 may be part of the radio access network and core network, respectively. The access router 172 detects user plane data flows toward the core network, and compresses the RTP/UDP/IP headers of the packets and multiplexes them with a new RTP/IP/UDP packet. The resulting Internet Protocol (IP) Datagram is then sent to the destination.

It is possible to allocate an IP address for every device board (e.g., each RLC board or UPP board in an RNC node). Using this alternative, every RLC device board takes care of generating inner RTP/UDP/IP packets, and another board in the node or in a separate node takes care of RTP multiplexing.

In another variation in which SSRC fields are not used to separate users, different UDP ports are used for different circuit switched connections (e.g., different user plane data flows).

Four example implementations of one aspect of the present invention have been described above. The present invention is not limited those these four example implementations. For example, other protocols can be used in conjunction with the invention's use of the Internet Protocol (IP) on the Iu-CS Interface, the Iur Interface, and the Iub Interface. For example, the present invention can also be used with the GRE (Generic Routing Encapsulation) protocol being above the Internet Protocol (IP) in the protocol stack architecture of the present invention.

As another aspect of the present invention, FIG. 8 shows how the new XTP Protocol of the present invention can also be utilized for the Iu-PS (Packet Switched) Interface. In particular, FIG. 8 illustrates the Iu-PS Interface connecting the radio access network 17 and packet switched aspect of core networks 19 (e.g., Serving GPRS Support Node (SGSN) 28) as having a user plane protocol stack 100-8. In the user plane protocol stack 100-8, the ATM and AAL5 protocols of the conventional arrangement (see FIG. 7) have been replaced with two protocols: an appropriate link layer protocol (e.g, Ethernet) and the IP Protocol. Thus, the user plane protocol stack 100-8 of the protocol architecture in the transport network layer for the FIG. 8 implementation comprises the link layer protocol (Ethernet), the Internet Protocol on top of the link layer protocol, the UDP Protocol on top of the Internet Protocol, and the XTP Protocol on top of the UDP Protocol. Further, the user plane data (e.g., end-to-end IP packets, etc.) is on top of the new XTP Protocol, which has been explained above.

Usage of the Internet Protocol (IP)-based protocol stacks of the invention involves an Internet Protocol (IP)-terminating board, device, or unit at a participating node (e.g., the radio network controller (RNC) 24 and MSC in the case of the Iu-CS Interface). In some hardware implementations, such Internet Protocol (IP)-terminating apparatus can be an extension terminal (ET) or interface unit. After termination of the Internet Protocol (IP), other protocols in the stack can be handled by one or more other boards or devices at the node. For example, in connection with the second implementation described with reference to FIG. 3, after the Internet Protocol (IP) is terminated, UDP packets can be delivered to a pertinent RLC processor (e.g., on radio link control (RLC) unit 50). For the second implementation of FIG. 4 involving the new XTP Protocol, one or more boards at the node can, after the Internet Protocol (IP) is terminated, process the XTP Protocol, with a destination board being selected according to UDP port number (or certain XTP identifiers can be mapped to appropriate boards of the node). The user plane data flow is forwarded to the appropriate radio link control (RLC) unit 50. For the fourth implementation described in FIG. 6 involving the RTP Protocol, after Internet Protocol (IP) termination the stack can be forwarded to another board selected according to UDP port number of outer RTP SSRC (synchronization source) field. The inner Internet Protocol (IP) packet is delivered to a board which terminates the outer RTP, after which the inner RTP/UDP/IP packet is delivered to a board such as radio link control (RLC) unit 50.

As an alternative hardware implementation, the Internet Protocol (IP) can be terminated at a board other than an extension (ET) board or interface. For example, with reference to the second implementation illustrated by FIG. 4, the Internet Protocol (IP) may be terminated at such other board as designated by IP address or UDP port number. This Internet Protocol (IP)-terminating board can also process the XTP packet and forward the payload (e.g., user plane data frames) to the pertinent RLC processor (e.g., in a radio link control (RLC) unit 50) according to the connection identifier field 144 (see FIG. 4A). Similarly, with respect to the fourth implementation illustrated in FIG. 6, the outer IP protocol can be terminated by a first (other) board, with the IP datagram being routed to such board according to IP address and/or UDP port number. This first board then forwards the inner RTP/UDP/IP packet to the pertinent RTP board according to an IP address and/or UDP port number.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications system having a protocol architecture over an interface between nodes of the telecommunications system, wherein for a connection with a user equipment unit a protocol stack of the protocol architecture in the transport layer comprises:
    a link layer protocol;
    Internet Protocol on top of the link layer protocol;
    UDP Protocol on top of the Internet Protocol;
    wherein the system is arranged to exchange Asynchronous Transfer Mode (ATM) and ATM Adaptation Layer 2 (AAL2) protocols with the Internet Protocol and the UDP Protocol;
    wherein the interface having the protocol architecture is one, of: (1) an interface between a core network and a radio access network which carries circuit switched connections; (2) an interface between a radio network controller (RNC) and a base station; and (3) an interface between two radio network controllers (RNCs);
    wherein the connection is carried as a circuit switched connection over a radio interface between the user equipment unit and the radio access network; and
    wherein UDP port numbers of the UDP Protocol are used as connection identifiers.

2. The system of claim 1, the Internet Protocol is immediately above the link layer protocol in the transport layer.

3. The system of claim 1, wherein the connection is a circuit switched connection and the interface having the protocol architecture carries the connection as a circuit switched connection.

4. The system of claim 1, wherein the link layer protocol is Ethernet protocol.

5. The system of claim 1, wherein in the Internet Protocol a sequence number is carried in one of an IP option field and a Ipv6 extension header, the sequence number being used for rearranging incoming IP datagrams.

6. The system of claim 1, wherein the protocol stack of the protocol architecture further comprises, in a radio network layer, a frame handling protocol on top of the UDP Protocol.

7. A telecommunications system having a protocol architecture over an interface between nodes of the telecommunications system, wherein for a connection with a user equipment unit a protocol stack of the protocol architecture in the transport layer comprises:
    a link layer protocol;
    Internet Protocol on top of the link layer protocol;
    UDP Protocol on top of the Internet Protocol; and
    RTP Protocol on top of the UDP Protocol, and
    wherein the system is arranged to exchange Asynchronous Transfer Mode (ATM) and ATM Adaptation Layer 2 (AAL2) protocols with the Internet Protocol, the UDP Protocol, and the RTP protocol;
    wherein the interface having the protocol architecture is between a radio access network and a core network and carries circuit switched connections;
    wherein the connection is carried as a circuit switched connection over a radio interface between the user equipment unit and the radio access network; and
    wherein in the RTP Protocol one synchronization source (SSRC) identifier is allocated to each circuit switched connection between the node in the radio access network and the node in the core network.

8. The system of claim 1, wherein the RTP Protocol compresses plural RTP packets in an IP datagram.

9. A method of operating a telecommunications system having a protocol architecture over an interface between nodes of the telecommunications system, the interface having the protocol architecture being one of: (1) an interface between a core network and a radio access network which carries circuit switched connections; (2) an interface between a radio network controller (RNC) and a base station; and (3) an interface between two radio network controllers (RNCs); the method comprising:
    including in a protocol stack of the protocol architecture in the transport layer for a connection with a user equipment unit, the following:
    a link layer protocol;
    Internet Protocol on top of the link layer protocol;
    UDP Protocol on top of the Internet Protocol;
    wherein the system is arranged to exchange Asynchronous Transfer Mode (ATM) and ATM. Adaptation Layer. 2 (AAL2) protocols with the Internet Protocol and the UDP Protocol;
    wherein the connection is carried as a circuit switched connection over a radio interface between the user equipment unit and the radio access network; and using UDP port numbers of the UDP Protocol as connection identifiers.

10. A method of operating a telecommunications system having a protocol architecture over an interface between a radio access network and a core network which carries circuit switched connections, the method comprising:
 including in a protocol stack of the protocol architecture in the transport layer for a connection with a user equipment unit, the following:
 a link layer protocol;
 Internet Protocol on top of the link layer protocol;
 UDP Protocol on top of the Internet Protocol; and
 RTP Protocol on top of the UDP Protocol;
 wherein the system is arranged to exchange Asynchronous Transfer Mode (ATM) and ATM Adaptation Layer 2 (AAL2) protocols with the internet Protocol, the UDP Protocol, and the RTP protocol;
 wherein the connection is carried as a circuit switched connection over a radio interface between the user equipment unit and the radio access network; and
 wherein in the RTP Protocol one synchronization source (SSRC) identifier is allocated to each circuit switched connection between the node in the radio access network and the node in the core network.

\* \* \* \* \*

UNITED STATES PATENT AND TRADEMARK OFFICE
CERTIFICATE OF CORRECTION

PATENT NO. : 7,302,497 B2
APPLICATION NO. : 09/734040
DATED : November 27, 2007
INVENTOR(S) : Vilander et al.

It is certified that error appears in the above-identified patent and that said Letters Patent is hereby corrected as shown below:

Title Page, Item (56) On Page 2, in Field (56), under "OTHER PUBLICATIONS", in Column 2, Line 1, delete "Oliver" and insert -- Olivier --, therefor.

In Column 2, Line 18, delete "networks)" and insert -- networks). --, therefor.

In Column 3, Line 23, delete "octets" and insert -- octets. --, therefor.

In Column 6, Lines 9-10, delete "(PSTNI-ISDN)" and insert -- (PSTN/ISDN) --, therefor.

In Column 6, Line 11, delete "283s" and insert -- 28 is --, therefor.

In Column 6, Lines 49-56, delete "The Iu Interface is shown between the core .......... aspect (Iu-PS)." and insert the same on line 48, after "Iu, Iur, and Iub." as a continuation of the paragraph.

In Column 9, Line 67, delete "Interface" and insert -- Interface. --, therefor.

In Column 11, Line 39, delete "simpification" and insert -- simplification --, therefor.

In Column 14, Line 17, delete "1803 and 1804" and insert -- $180_3$ and $180_4$ --, therefor.

In Column 14, Line 55, delete "e.g," and insert -- e.g., --, therefor.

In Column 15, Line 63, in Claim 1, delete "one," and insert -- one --, therefor.

In Column 16, Line 62, in Claim 9, delete "ATM." and insert -- ATM --, therefor.

In Column 16, Line 63, in Claim 9, delete "Layer." and insert -- Layer --, therefor.

UNITED STATES PATENT AND TRADEMARK OFFICE
CERTIFICATE OF CORRECTION

PATENT NO. : 7,302,497 B2
APPLICATION NO. : 09/734040
DATED : November 27, 2007
INVENTOR(S) : Vilander et al.

It is certified that error appears in the above-identified patent and that said Letters Patent is hereby corrected as shown below:

In Column 18, Line 3, in Claim 10, delete "internet" and insert -- Internet --, therefor.

Signed and Sealed this

Fourteenth Day of October, 2008

JON W. DUDAS
*Director of the United States Patent and Trademark Office*